G. S. BILLMAN.
MACHINE FOR CLEANING INTESTINES.
APPLICATION FILED JULY 21, 1910.

1,009,215.

Patented Nov. 21, 1911.

2 SHEETS—SHEET 1.

WITNESSES:
G. H. Bonk
O. M. McLaughlin

INVENTOR.
Gustus S. Billman.
BY
V. H. Lockwood
ATTORNEY.

COLUMBIA PLANOGRAPH CO., WASHINGTON, D. C.

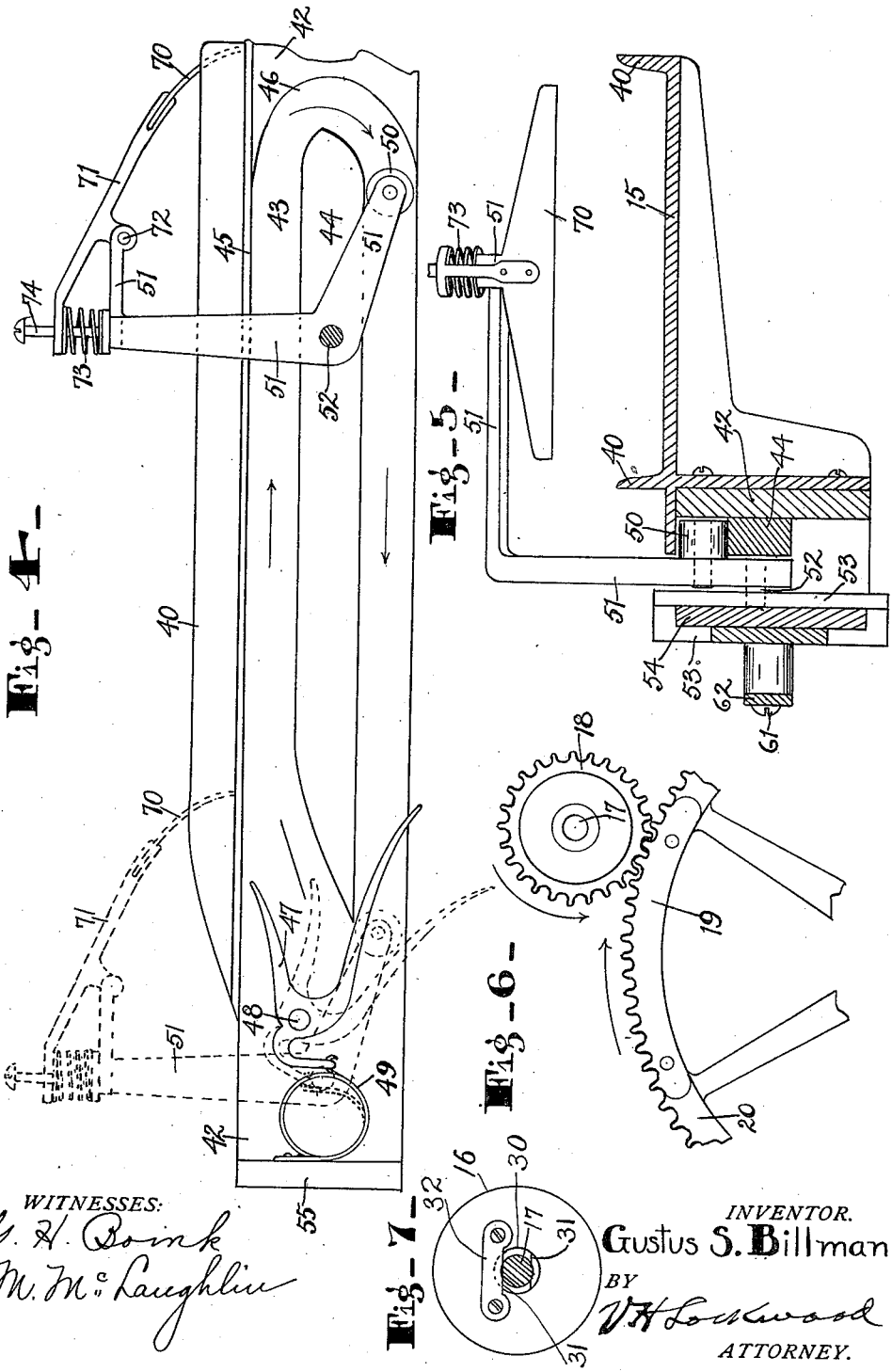

UNITED STATES PATENT OFFICE.

GUSTUS S. BILLMAN, OF SHELBYVILLE, INDIANA.

MACHINE FOR CLEANING INTESTINES.

1,009,215.  Specification of Letters Patent.  Patented Nov. 21, 1911.

Application filed July 21, 1910. Serial No. 572,988.

*To all whom it may concern:*

Be it known that I, GUSTUS S. BILLMAN, of Shelbyville, county of Shelby, and State of Indiana, have invented a certain useful Machine for Cleaning Intestines; and I do hereby declare that the following is a full, clear, and exact description thereof, reference being had to the accompanying drawings.

The object of this invention is to provide an improved machine for cleaning intestines and the like.

One feature of the invention consists in means for intermittently moving the intestine over the scraping platform or table, so that it will be stationary during the plurality of movements or operations of the scraper. This enables the machine to be used successfully for cleaning "green" as well as old intestines.

The nature of the invention will be understood from the accompanying drawings and the following description and claims.

Figure 1:
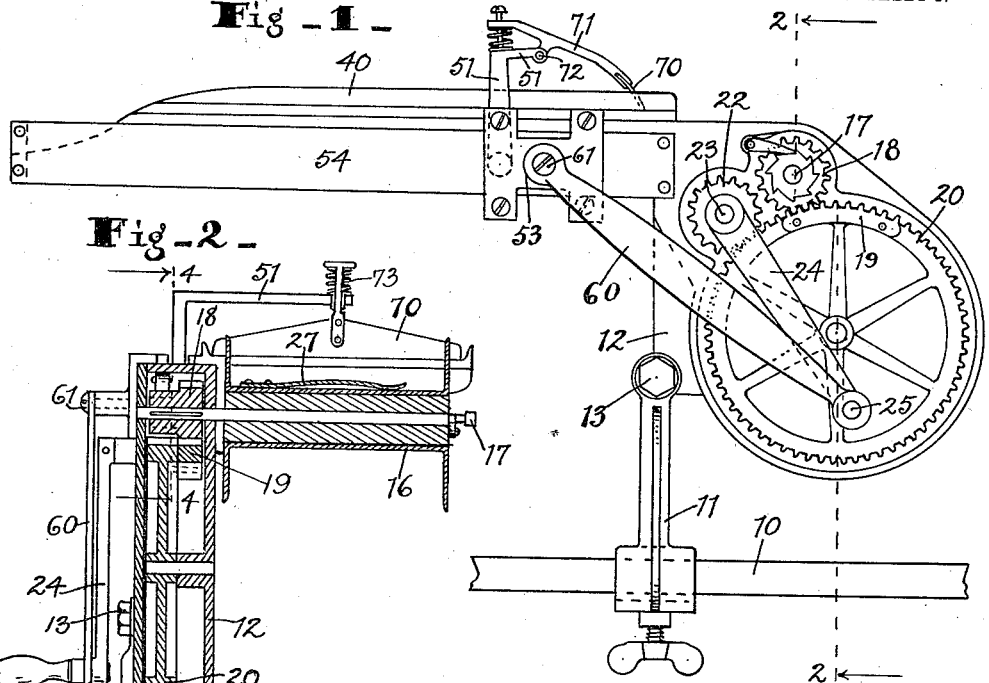
Figure 2:
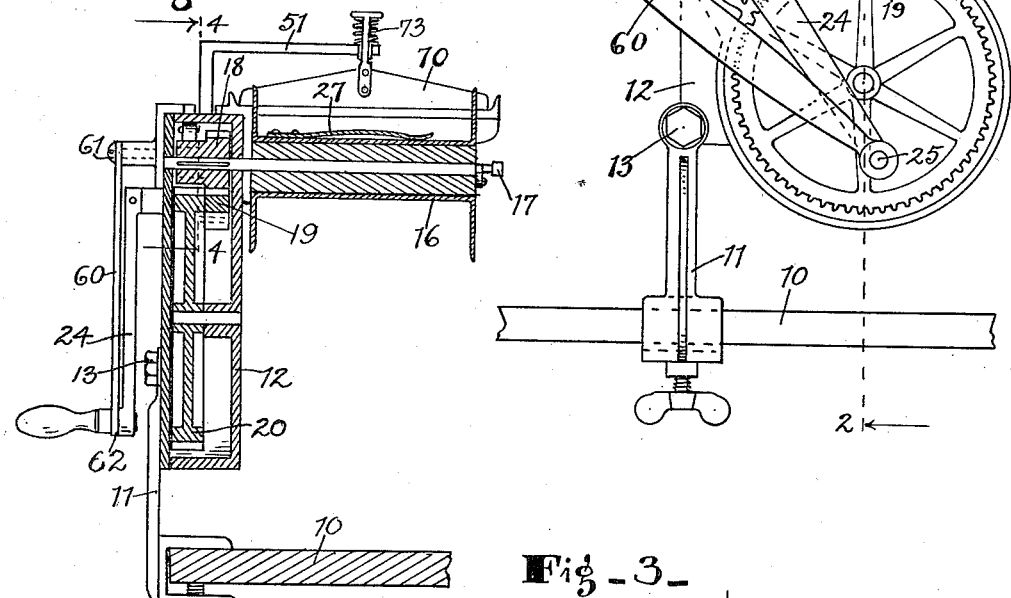
Figure 3:
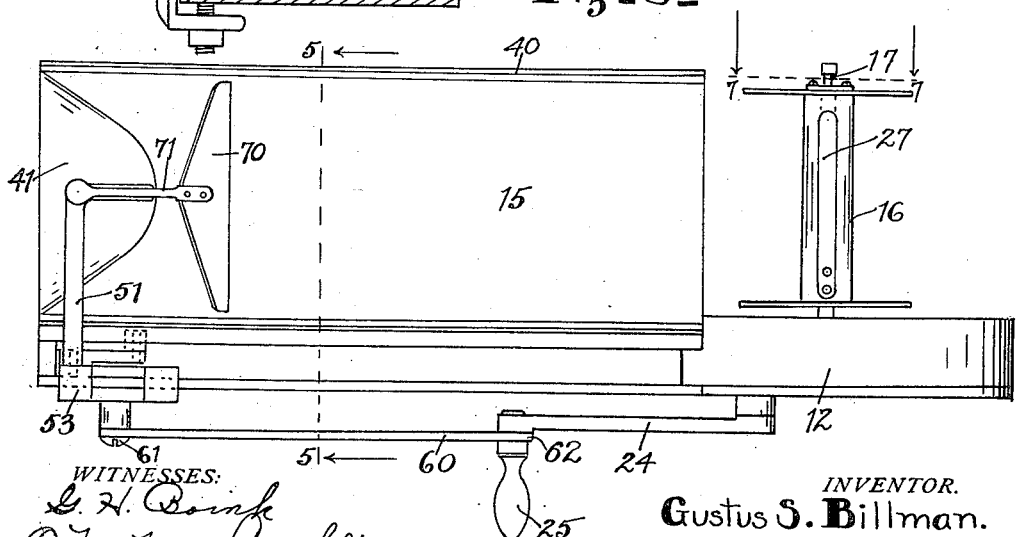

In the drawings Figure 1 is a side elevation of the device clamped to a fixed structure which is partially broken away. Fig. 2 is a transverse section on the line 2—2 of Fig. 1. Fig. 3 is a plan view of the device. Fig. 4 is a vertical section, on an enlarged scale, on the line 4—4 of Fig. 2, part of the machine being broken away and the scraper and carriage arm being shown in one position by full lines and in the other position by dotted lines. Fig. 5 is a transverse section on the line 5—5 of Fig. 3 showing the scraper elevated. Fig. 6 is a detail of a portion of the gearing. Fig. 7 is a detail of the means for locking and unlocking the reel with its shaft.

The drawings show a portion of a fixed structure 10 to which a clamp 11 is removably secured, which has an upwardly extending arm to which the frame 12 of the machine is secured by a screw 13, so that the frame of the machine may be arranged horizontally, as shown in Fig. 1, or tilted somewhat as may be desired.

The table or platform 15 is mounted in connection with the frame and over it intestines are drawn by the reel 16 mounted on the shaft 17, one end of which is mounted in the frame. The shaft 17 has secured on it a pinion 18 that meshes with a segmental gear 19 secured to the spur gear 20, as indicated in Fig. 6. The segmental gear 19 is in line with the periphery of the wheel, so that at each revolution of the wheel 20 the pinion 18 will be given about half a revolution. The wheel 20 is actuated by the pinion 22 on the spindle 23 that is mounted in the frame and has secured to it the crank 24 which carries a handle 25. The machine shown is a hand-actuated machine, but it may be driven in any other manner. By making the driving pinion 22 relatively smaller than the gear 20, the operation of the device is rendered easy and the movements of the scraper increased in proportion to the actuations of the reel. In the machine shown the scraper will make about four movements to one of the reel.

The reel has a spring clamp 27 for holding the end of the intestine while the reeling process is started. The shaft 17 has a reduced portion 30 and adjacent it a squared portion 31. The reel 16 has a plate 32 secured at its end adapted to fit snugly any-one of sides of the squared portion 31, and, therefore, cause the reel to turn with the shaft when it is moved longitudinally on the shaft into engagement with said squared portion, and when the reel is moved longitudinally on the shaft so that said plate will not engage the squared portion but will register with the reduced portion, the shaft will not actuate the reel and the reel will be independently revoluble. This latter arrangement is for the purpose of enabling the intestine to be removed from the reel without operating the rest of the machine backward.

The table or platform 15 has sides 40 extending above the same and at their rear end is dished out or sloped downwardly, as at 41, so that the intestines will move over said rear end without being cut or injured thereby.

At one side of the table there is a plate 42 which extends longitudinally of the table and also downwardly therefrom and has a guideway 43 formed of a central guide 44, an upper guide 45 and a guide 46 at one end. At the other end the central guide 44 is tapered to a point and a two-armed trip 47 is pivoted on the pin 48 in the plate 42 in position to coöperate with the pointed end of the guide 44 for transferring the roller 50 on one end of the carriage arm 51, as the same is reciprocated, from the underside of the guide 44 to the upper side. The carriage arm 51 is fulcrumed on the pin 52 which is secured to the carriage 53, which reciprocates on a plate 54 secured at one end to the frame 12 and at the other end to the outwardly turned end 55 of the plate 42. Hence the plates 42 and 54 are spaced away from each other. A connecting bar 60 is pivoted at 61 to the carriage and at 62 to the end of the crank 24 and to the handle 25. Hence as the crank 24 is actuated, the carriage 53 will be reciprocated along the plate 54 and the roller 50 will travel around the guide 44 on the plate 42 in the direction indicated by the arrows in Fig. 4, and as it does so will cause the carriage arm 51 to rock, that is, while the roller 50 is traveling rearward, as shown in Fig. 4, the main portion of the arm 51 will be vertical, but while the roller 50 travels over the guide 44 and forwardly, the upper end of the arm 51 will be tilted backwardly so as to raise and hold the scraper 70 elevated above the table 15, as shown in Fig. 5. The dotted lines shown in Fig. 4 of the scraper and arm 51 indicate their positions just before this rocking movement takes place and also indicate the position of the trip 47. The lower end of the trip 47 is thrown downwardly by the roller 50 to the dotted line position and as the roller rolls up on the lower part to the central part of said trip and starts its return movement, a spring 49 returns the trip to its normal and full line position so as to start the roller 50 upward on the inclined rear end of the guide 44. The spring 49 is secured to the turned end 55 of the plate 42 and acts downwardly on the heel portion of the trip 47.

The scraper 70 is secured on the scraper arm 71, which is fulcrumed between its ends at 72 to an upwardly forwardly extending portion of the arm 51. The carriage arm 51 has four portions, three of which appear in Fig. 4, namely, the portion below the fulcrum 52, the upright portion above the fulcrum 52, and the upwardly and forwardly extending portion 51, but there is an inwardly extending horizontal portion between the vertical portion shown in Fig. 4 and the upwardly and forwardly extending portion. This transverse portion appears in Fig. 5. The spring 73, which is mounted on the end of the transverse portion of the carriage arm 51 around the pin 74, pushes upwardly on the rear end of the scraper arm 71 and tends to hold the scraper in a downward position, as shown in Fig. 4.

In operation, an intestine is placed longitudinally on a table 15 and secured to a reel under a spring 27. Then the crank handle 24 is operated constantly in a forward direction by hand and at each revolution of said crank handle 24, the carriage 53 makes a backward and forward movement, and during the rearward movement the scraper presses down on the intestine and scrapes it while the intestine is stationary, and during the forward movement the scraper is tilted backward so as to elevate the same. During one revolution of the crank 24 this occurs four times, so that four scraping movements take place. During one forward movement of the scraper and while it is elevated, the intestine is given a forward movement by the reel. Hence the gearing is so arranged that the segmental gear 19 will mesh with the pinion which actuates each wheel while the scraper is making its forward and elevated movement. The advantage of giving the intestine a plurality of scrapings before it is moved is that it remains distended and flattened after the first scraping movement, so that the subsequent scraping movements will be very effective, whereas if the intestine is drawn or moved between each action of the scraper, it loses the distended position, so that the scraper in every action in such case would have to flatten out the intestine as well as scrape it and hence would not be so effective or so completely scrape and clean the intestine. This operation of the machine is continued until the reel is full, and then the reel is slipped longitudinally on its shaft slightly, so that it may be turned independently of the shaft, and the intestine is drawn off the reel.

I claim as my invention:

1. A machine for cleaning intestines including a scraping table on which the intestine may be placed longitudinally, reciprocable means for scraping the intestine while on the table, means for giving the intestine a lengthwise movement, and means for actuating the scraping means and the means for moving the intestine arranged so that the scraping means will be given a plurality of scraping movements prior to each movement of the intestine.

2. A machine for cleaning intestines including a scraping table on which the intestine may be placed longitudinally, a carriage slide plate secured beside said table, a carriage reciprocable on said slide plate, a rocking arm mounted on said carriage and projecting over said table, a scraping device carried by said arm, and means for causing said arm to rock at the end of each movement of said carriage and bring the scraper down on the table at one rocking movement thereof and elevate the scraper from the table at the other rocking movement of said arm.

3. A machine for cleaning intestines including a scraping table on which the intestine may be placed longitudinally, a plate at the side of said table provided with a longitudinally extending guide provided with a circuitous guideway around a longitudinal guide, a carriage slide plate secured beside and spaced from said guide plate, a reciprocating carriage on said carriage slide plate, a rocking arm mounted on said carriage with one end projecting into said guideway and the other end extending over said table, a scraper carried by the latter end of said arm, and means on said guide plate at the end of said longitudinal guide for causing the end of the arm which projects into said guideway to travel above said guide while moving forwardly and under said guide while moving rearwardly.

In witness whereof, I have hereunto affixed my signature in the presence of the witnesses herein named.

GUSTUS S. BILLMAN.

Witnesses:
G. H. BOINK,
J. H. WELLS.

Copies of this patent may be obtained for five cents each, by addressing the "Commissioner of Patents, Washington, D. C."